S. W. BEACH.
Hub.
No. 17,360.  Patented May 26, 1857.
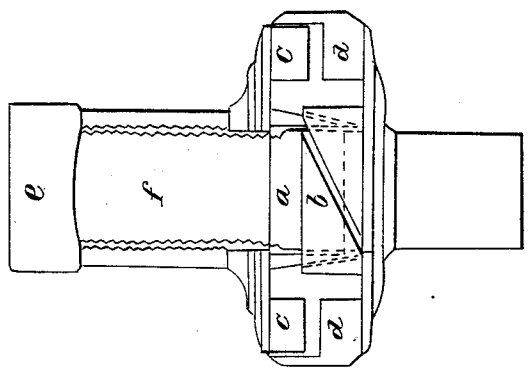
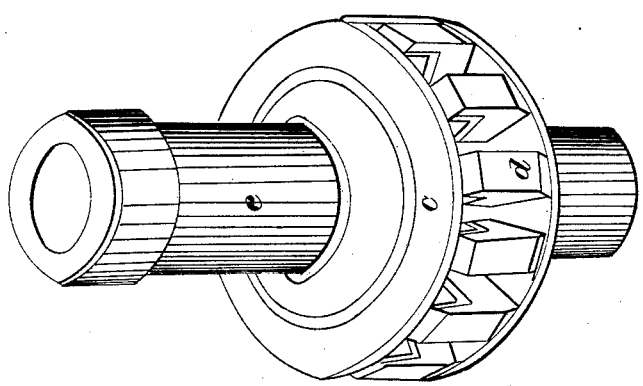
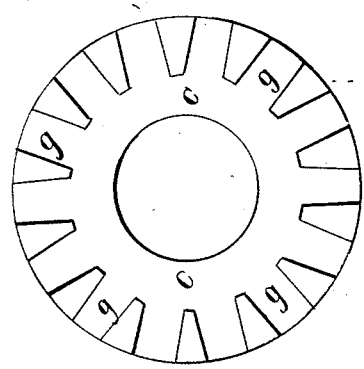

UNITED STATES PATENT OFFICE.

SYLVESTER W. BEACH, OF CHICAGO, ILLINOIS

CARRIAGE-HUB.

Specification of Letters Patent No. 17,360, dated May 26, 1857.

*To all whom it may concern:*

Be it known that I, SYLVESTER W. BEACH, of the city of Chicago and county of Cook and State of Illinois, have invented a new Improvement in Metallic Hubs; and I hereby declare that the following is a full and exact description thereof, reference being made to the accompanying drawings and description thereof.

$a$ is a conical wedge.

$b$ is the elastic ring.

$g$ the dovetail apertures in the hub.

$c$ is the movable plate.

$d$ is the stationary plate which is attached to the pipe or box.

$f$ is the pipe or box; $e$ is the outside screw plate. And it will be seen that by turning the screw plate to the right it forces the movable together with the stationary plate and at the same time operating on the conical wedge $a$ expanding the elastic ring $b$ thereby forcing the spoke through the dovetail apertures tightening the tire and at the same time tightening the spoke in the hub.

I do not claim broadly the application of a conical wedge and elastic ring as new, but What I do claim and desire to secure by Letters Patent is—

The combination of the conical wedge and elastic ring with the dovetail form of the spoke apertures in the hub as described and substantially set forth.

SYLVESTER W. BEACH.

Witnesses:
 S. F. COLLINS,
 J. TILDEN MOULTON.